US009661023B1

(12) United States Patent
Fang et al.

(10) Patent No.: US 9,661,023 B1
(45) Date of Patent: May 23, 2017

(54) SYSTEMS AND METHODS FOR AUTOMATIC ENDPOINT PROTECTION AND POLICY MANAGEMENT

(71) Applicant: Symantec Corporation, Mountain View, CA (US)

(72) Inventors: Ke Fang, Sichuan (CN); Liu Yang, Sichuan (CN)

(73) Assignee: Symantec Corporation, Mountain View, CA (US)

( * ) Notice: Subject to any disclaimer, the term of this patent is extended or adjusted under 35 U.S.C. 154(b) by 301 days.

(21) Appl. No.: 13/940,902

(22) Filed: Jul. 12, 2013

(51) Int. Cl.
*G06F 17/00* (2006.01)
*H04L 29/06* (2006.01)

(52) U.S. Cl.
CPC .................................. *H04L 63/20* (2013.01)

(58) Field of Classification Search
CPC . H04L 41/0813; H04L 41/0816; H04L 43/10; H04L 63/104; H04L 67/10; H04L 45/021; H04L 47/125; H04L 47/14; H04L 47/20; H04L 47/2416; G06F 21/00; G06F 21/30; G06F 21/31; G06F 21/50; G06F 21/60; G06F 21/62
USPC ............ 726/1, 28, 29, 30; 709/225; 370/236
See application file for complete search history.

(56) References Cited

U.S. PATENT DOCUMENTS

| | | | | |
|---|---|---|---|---|
| 7,385,938 B1 * | 6/2008 | Beckett | ............... | H04L 41/0813 370/254 |
| 8,566,947 B1 * | 10/2013 | Sankruthi | ............... | G06F 21/55 726/22 |
| 8,583,769 B1 * | 11/2013 | Peters | .................. | G06F 9/541 709/221 |
| 8,776,168 B1 * | 7/2014 | Gibson | ................. | H04L 63/104 709/225 |
| 2003/0101247 A1 * | 5/2003 | Kumbalimutt | ...... | H04L 12/2602 709/221 |
| 2005/0149940 A1 * | 7/2005 | Calinescu | ............. | G06F 9/5061 718/104 |
| 2005/0278777 A1 * | 12/2005 | Loza | ....................... | H04L 63/20 726/4 |
| 2007/0027975 A1 * | 2/2007 | Tai | ...................... | H04L 29/1216 709/223 |
| 2007/0174909 A1 * | 7/2007 | Burchett | ............... | G06F 21/602 726/18 |
| 2008/0005285 A1 * | 1/2008 | Robinson | ............ | H04L 41/0893 709/220 |
| 2008/0025261 A1 * | 1/2008 | Riley | ................... | H04L 41/0893 370/331 |
| 2008/0195755 A1 * | 8/2008 | Lu | .......................... | H04L 29/06 709/241 |
| 2008/0201780 A1 * | 8/2008 | Khan | .................... | G06F 21/577 726/25 |

(Continued)

*Primary Examiner* — Gary Gracia

(74) *Attorney, Agent, or Firm* — Holland & Hart LLP

(57) ABSTRACT

A computer-implemented method for dynamically adjusting server settings is described. In one embodiment, at least one parameter of a status of a server that diverges from a corresponding baseline setting of a policy maintained by the server may be identified. An adjustment to the baseline setting of the policy may be calculated based at least in part on the divergent parameter. The baseline setting of the policy may be adjusted according to the calculated adjustment. A command may be issued to send data representative of the adjusted baseline setting of the policy from the server to a client to update a user profile.

15 Claims, 7 Drawing Sheets

(56) References Cited

U.S. PATENT DOCUMENTS

| | | | |
|---|---|---|---|
| 2009/0013034 A1* | 1/2009 | Cheng | H04L 67/02 709/203 |
| 2009/0157870 A1* | 6/2009 | Nakadai | G06F 9/505 709/224 |
| 2009/0182605 A1* | 7/2009 | Lappas | G06Q 30/04 705/34 |
| 2009/0210267 A1* | 8/2009 | Fish et al. | 705/7 |
| 2010/0115578 A1* | 5/2010 | Nice | G06F 21/31 726/1 |
| 2010/0212008 A1* | 8/2010 | Jaganathan | G06F 21/6218 726/19 |
| 2010/0242088 A1* | 9/2010 | Thomas | G06F 21/554 726/3 |
| 2011/0023118 A1* | 1/2011 | Wright | G06F 11/28 726/23 |
| 2011/0047597 A1* | 2/2011 | Mahaffey | G06F 21/564 726/3 |
| 2011/0061089 A1* | 3/2011 | O'Sullivan | H04L 63/102 726/1 |
| 2011/0088028 A1* | 4/2011 | Tofighbakhsh | H04L 41/0806 717/178 |
| 2012/0039175 A1* | 2/2012 | Sridhar et al. | 370/236 |
| 2012/0143821 A1* | 6/2012 | Mallya | H04L 41/0853 707/639 |
| 2012/0144492 A1* | 6/2012 | Griffin | G06F 21/56 726/25 |
| 2012/0191536 A1* | 7/2012 | Chen | G06Q 30/02 705/14.49 |
| 2012/0254436 A1* | 10/2012 | Bihani | G06F 9/54 709/226 |
| 2012/0272317 A1* | 10/2012 | Rubin | G06F 21/552 726/23 |
| 2013/0268470 A1* | 10/2013 | Yablokov | G06Q 10/107 706/15 |

\* cited by examiner

SYSTEMS AND METHODS FOR AUTOMATIC ENDPOINT PROTECTION AND POLICY MANAGEMENT

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand an increase in the efficiency of these technologies. Improving the efficiency of computer technologies is always desirable to anyone who uses and relies on computers.

The wide-spread use of computing devices and the computer networks to which they connect has seen an increase in issues dealing with network stability and security risks. Unexpected increases in server requests and network connections as well as constantly evolving malware may affect the functionality and availability of a network and the devices connected to the network. As a result, benefits may be realized by providing systems and methods for automatically adjusting network policy and settings according to a current status of the network and/or connected devices.

SUMMARY

According to at least one embodiment, a computer-implemented method for dynamically adjusting server settings is described. In one embodiment, at least one parameter of a status of a server that diverges from a corresponding baseline setting of a policy maintained by the server may be identified. An adjustment to the baseline setting of the policy may be calculated based at least in part on the divergent parameter. The baseline setting of the policy may be adjusted according to the calculated adjustment. A command may be issued to send data representative of the adjusted baseline setting of the policy from the server to a client to update a user profile.

In some embodiments, a degree of difference may be determined between the at least one parameter of the server status and the baseline setting of the policy maintained by the server. The degree of difference may be compared to a predetermined parameter threshold, and upon determining the degree of difference satisfies the predetermined parameter threshold, the baseline setting of the policy maintained by the server may be adjusted. Upon determining the degree of difference fails to satisfy the predetermined parameter threshold for a predetermined amount of time, the policy may be maintained according to a present setting of the policy.

In some embodiments, a determination may be made whether a frequency at which security risks occur on the client satisfies a threshold. Upon determining the frequency at which security risks occur on the client satisfies the threshold, a security setting of the policy maintained by the server may be adjusted. Upon determining the frequency at which security risks occur on the client fails to satisfy the threshold, a security setting of the policy maintained by the server may be maintained and enforced as is.

A computing device configured to dynamically adjust server settings is also described. The device may include a processor and memory in electronic communication with the processor. The memory may store instructions that are executable by the processor to identify at least one parameter of a status of a server that diverges from a corresponding baseline setting of a policy maintained by the server, calculate an adjustment to the baseline setting of the policy based at least in part on the divergent parameter, adjust the baseline setting of the policy according to the calculated adjustment, and issue a command to send, via the processor, data representative of the adjusted baseline setting of the policy from the server to a client to update a user profile.

A computer-program product to dynamically adjust server settings is also described. The computer-program product may include a non-transitory computer-readable medium that stores instructions. The instructions may be executable by a processor to identify at least one parameter of a status of a server that diverges from a corresponding baseline setting of a policy maintained by the server, calculate an adjustment to the baseline setting of the policy based at least in part on the divergent parameter, adjust the baseline setting of the policy according to the calculated adjustment, and issue a command to send, via the processor, data representative of the adjusted baseline setting of the policy from the server to a client to update a user profile.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
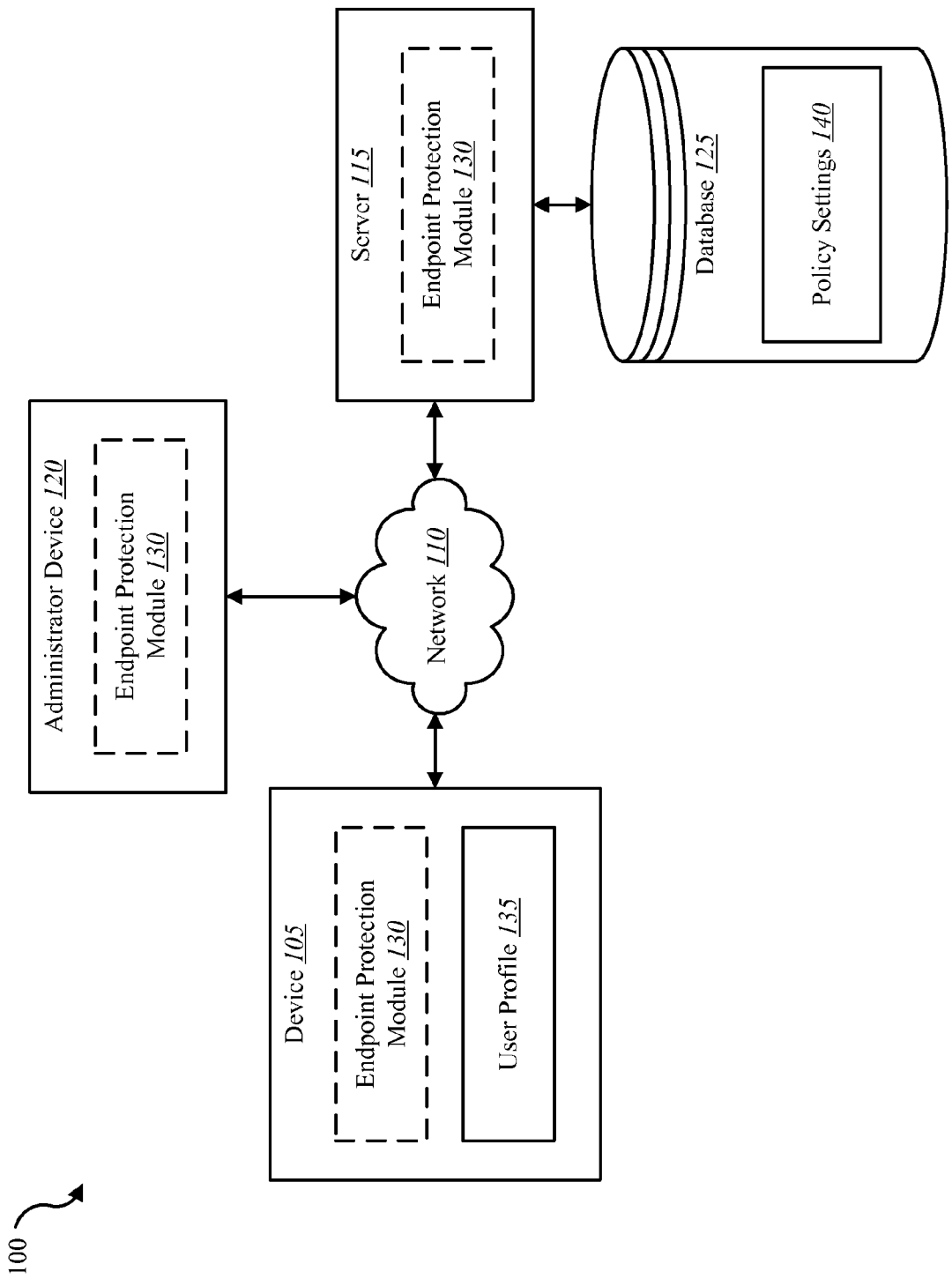
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed.

Rather, the instant disclosure covers all modifications, equivalents, and alternatives falling within the scope of the appended claims.

DETAILED DESCRIPTION OF EXEMPLARY EMBODIMENTS

The systems and methods described herein relate to dynamically adjusting server settings. More specifically, the systems and methods described herein relate to automatic endpoint protection and policy management.

Endpoint protection provides systems and methods to protect a communication and/or data network and resources connected to that network. A policy associated with endpoint protection may require each computing device on the network to comply with certain standards before network access is granted. Endpoints can include any sort of device that can connect to the network including desktops, laptops, smart phones, tablets, and specialized equipment such as bar code readers or point of sale terminals.

Endpoint protection systems may function on a client/server model in which a centrally managed server or gateway hosts the security program and an accompanying client program is installed on each network device. When a client attempts to log onto the network, the server program validates user credentials and scans the device to ensure that the device complies with defined corporate security policies before allowing access to the network. Criteria for network access may include an approved operating system, a virtual private network (VPN) client, and anti-virus software with current updates. Devices that do not comply with policy may be given limited access or quarantined on a virtual local area network (VLAN).

Endpoint protection may include personal firewalls or anti-virus software that is distributed and then monitored and updated from a server. Endpoint protection may also include intrusion detection with behavior-blocking components that monitor devices for activity indicating malware. Endpoint protection may provide anti-virus services from a computing cloud environment, where the host server and its security programs are maintained remotely by a vendor (e.g., software-as-a-service (SaaS)).

Currently, a network administrator may design network policy and settings according to a current deployment size and infrastructure. However, performance issues such as network storm and server hang caused by spikes in workload on a management server, sudden increases in client endpoints, improper management of network policy and settings, and the like, may pose risks to endpoint protection and overall stability of the network. For example, when the number of clients connected to the network changes dramatically, servers may not be able to sustain the resulting increased workload. To handle the increased server workload, the network administrator may add additional servers or manually redesign the server policy and settings. In some cases, a network administrator may improperly configure the network policy and setting, resulting in network downtime and reduction in user productivity.

Similarly, malware and other security risks may affect elements of the network at any given time. Applying a high-security policy at all times, however, may needlessly consume system resources. On the other hand, maintaining a default security policy during periods of increased security risks (or applying a high-security policy after the attack initiates or after malware causes harm to the network) may place the stability of the network and endpoint protection at risk.

The present systems and methods provide for the monitoring and automatic adjustment of endpoint protection policy and settings according to current server status and predetermined baseline parameters and models, thus, minimizing harmful network conditions caused by human error and the delayed responses of network administrators to changing network conditions. Thus, the present systems and methods allow a network to automatically adjust and adapt (e.g., increase the scan and definition update frequency, increase the sensitivity level for reputation system, apply strict firewall rules, etc.) to changing network conditions in order to maintain endpoint protection without human intervention.

FIG. 1 is a block diagram illustrating one embodiment of an environment 100 in which the present systems and methods may be implemented. Environment 100 may include device 105, network 110, server 115, administrator device 120, and database 125. In some embodiments, a device 105 may communicate with server 115, administrator device 120, and/or database 125 via network 110. In some configurations, device 105 may include endpoint protection module 130 and user profile 135. Examples of devices 105 include mobile devices, smart phones, personal computing devices, computers, servers, etc. In some embodiments, one or more of the devices depicted in environment 100 (e.g., devices 105, 115, 120, and 125) may be an endpoint protected by the system and methods of endpoint protection module 130. Examples of network 110 include, local area networks (LAN), wide area networks (WAN), virtual private networks (VPN), wireless networks (using 802.11, for example), cellular networks (using 3G and/or LTE, for example), etc. In some configurations, the network 110 may include the internet. User profile 135 may specify user credentials, network access control, domains, type of user account (e.g., administrator, general user, roaming, etc.), access to applications and programs, software updates, synchronization schedules and time-outs, computer security settings, membership in certain groups in the network, bandwidth limits, access and restrictions to sites on the network, access and restrictions to internet and internet sites, and the like.

In some embodiments, the systems and methods described herein may be performed on a single device (e.g., device 105, server 115, or administrator device 120). For example, endpoint protection module 130 may be located solely on device 105. In some embodiments, device 105 may not include endpoint protection module 130. For example, device 105 may include an application that allows device 105 to interface with endpoint protection module 130 located on server 115 and/or administrator device 120. In some embodiments, device 105, server 115, and administrator device 120 may include an endpoint protection module 130 where at least a portion of the functions and operations of endpoint protection module 130 are performed separately and/or concurrently on device 105, server 115, and/or administrator device 120. In one case, a user of administrator device 120 may initiate a process of endpoint protection module 130 that executes on administrator device 120, over network 110, and on device 105 and/or server 115. In another case, a user of administrator device 120 may initiate a process of endpoint protection module 130 on device 105 that executes on device 105.

In some embodiments, server 115 may include endpoint protection module 130 and may be coupled to database 125. Database 125 may include policy settings 140. Device 105 may be coupled to database 125 through network 110. In one example, endpoint protection module 130 may access policy settings 140 in the database 125 via server 115. Database 125 may be internal or external to server 115. In some embodiments, database 125 may be internal or externally connected to administrator device 120 and/or device 105. Further details regarding endpoint protection module 130 are discussed below.

Figure 2:
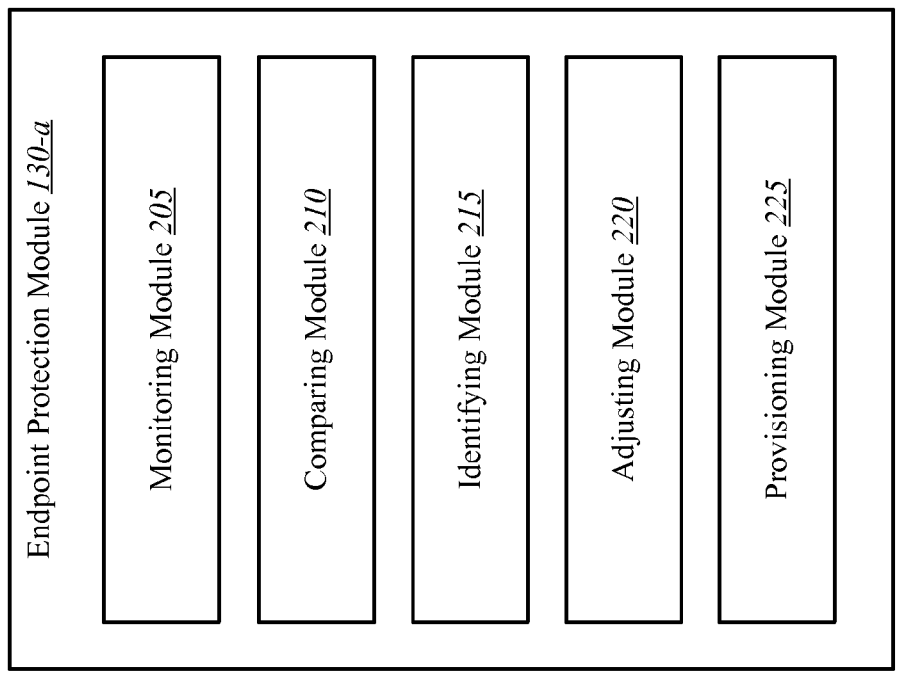
FIG. 2 is a block diagram illustrating one example of endpoint protection module.

FIG. 2 is a block diagram illustrating one example of endpoint protection module 130-*a*. Endpoint protection module 130-*a* may be one example of endpoint protection module 130 depicted in FIG. 1. As depicted, endpoint protection module 130-*a* may include monitoring module 205, comparing module 210, identifying module 215, adjusting module 220, and provisioning module 225.

As described above, endpoint protection module 130-*a* may monitor and automatically adjust endpoint protection policy and settings according to a current server status and predetermined baseline parameters and models. Thus, endpoint protection module 130 may automatically adapt to changing network conditions and security risks in order to enforce policies that protect endpoints and maintain network stability. At least some of the operations and functions of endpoint protection module 130-*a* may be performed by or in conjunction with modules 205-225.

In one embodiment, monitoring module 205 may be configured to monitor a status of device 105, network 110, server 115, and/or database 125. A status of one or more of these devices may include central processing unit (CPU) usage, CPU capacity, memory usage, memory capacity, storage usage, storage capacity, network communication bandwidth, database type, number of connected clients, client security risks, a client request type, and the like. A client request type may include a scan request, an upgrade request, an update request, a content download request, etc.

In one example, identification module 210 may identify at least one parameter of a status of a server that diverges from a corresponding baseline setting of a policy maintained by the server (e.g., policy settings 140 maintained by server 115). A policy maintained by the server may include any setting designed to preserve network stability as well as maintain and protect endpoints connected to a network (e.g., device 105 and server 115 connected to network 110). The policy settings may include a central processing unit (CPU) setting, a memory setting, a storage setting, a network setting, a client setting, a virtual environment setting, a heartbeat interval setting, a randomization setting, and the like.

In one embodiment, adjusting module 220 may calculate an adjustment to the baseline setting of the policy based at least in part on the parameter identified by identification module 210 to diverge from present settings of the policy maintained by the server. Adjusting module 220 may adjust the baseline setting of the policy according to the adjustment calculated. In response to the adjusting module 220 adjusting the baseline setting of the policy, provisioning module 225 may issue a command to send data representative of the adjusted baseline setting of the policy from a server to a client (e.g., server 115 to device 105) for the purpose of updating a user profile associated with the client (e.g., user profile 135). In some embodiments, identifying module 215 may determine a degree of difference between the at least one parameter of the server status and the baseline setting of the policy maintained by the server. Comparing module 210 may compare the degree of difference to a predetermined parameter threshold, and upon determining the degree of difference satisfies the predetermined parameter threshold, adjusting module 220 may adjust the baseline setting of the policy maintained by the server. Upon determining the degree of difference fails to satisfy the predetermined parameter threshold, endpoint protection module 130-*a* may maintain and enforce the policy according to the policy's present settings. In some embodiments, in order to compensate for minor and temporary fluctuations, adjusting module 220 may determine whether the degree of difference satisfies the predetermined parameter threshold for a predetermined amount of time. Thus, upon determining the degree of difference satisfies the predetermined parameter threshold for a predetermined amount of time, adjusting module 220 may adjust the baseline setting of the policy maintained by the server. Otherwise, upon determining the degree of difference fails to satisfy the predetermined parameter threshold for the predetermined amount of time, the policy may be maintained according to a present setting of the policy.

In some embodiments, identifying module 215 may determine a frequency at which security risks occur on a computing device. Security risks may include malware, data leakage, data breach, data loss without a backup, non-privileged user access, user-installed applications, devices without the latest software updates and patches, and the like. Comparing module 210 may compare the frequency of security risks to a predetermined security threshold. Identifying module 215 may determine whether a frequency at which security risks occur on the client satisfies the predetermined security threshold. Upon determining the frequency at which security risks occur on the client satisfies the threshold, adjusting module 220 may adjust a security setting of a policy maintained by a server. Provisioning module 225 may update one or more endpoint devices according to the adjustment of the security setting of the policy. Upon determining the frequency at which security risks occur on the client fails to satisfy the threshold, endpoint protection module 130-*a* may maintain a security setting of the policy maintained by the server.

Figure 3:
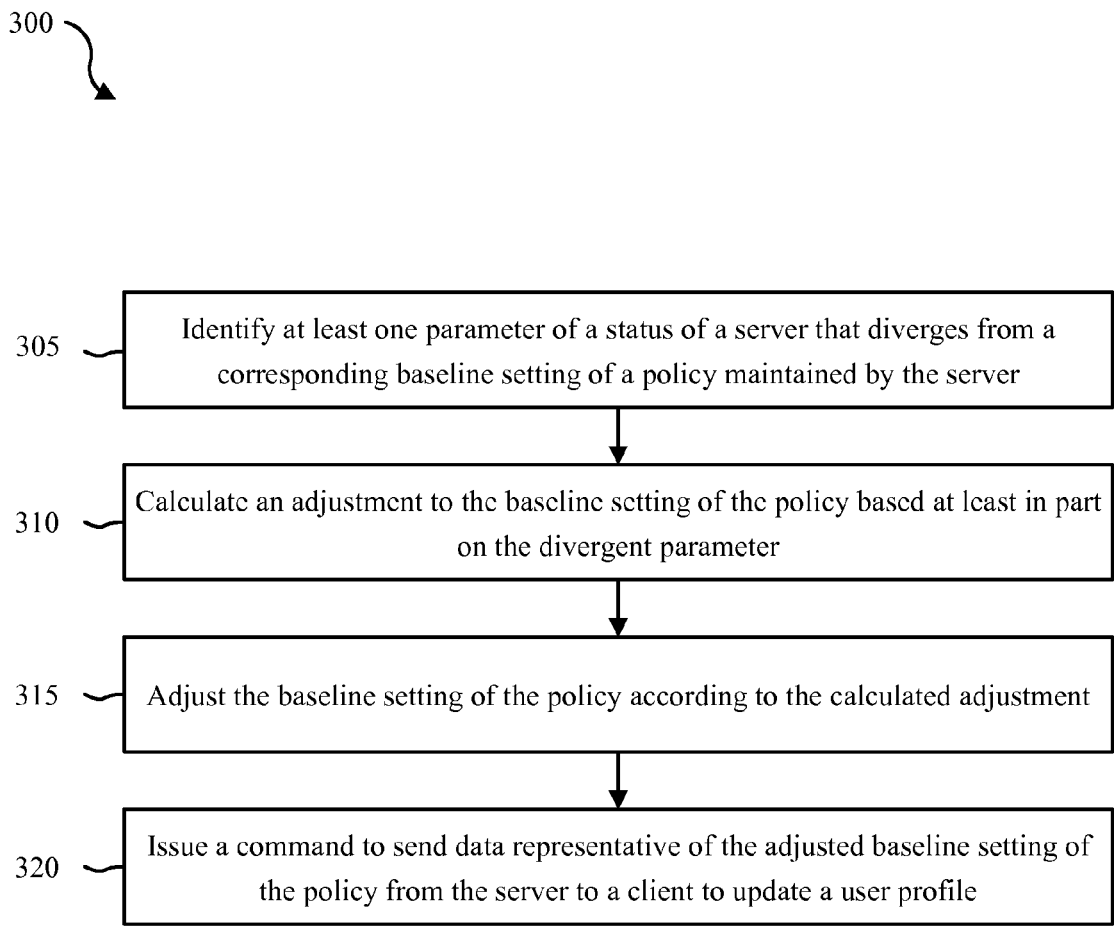
FIG. 3 is a flow diagram illustrating one embodiment of a method for dynamically adjusting server settings.

FIG. 3 is a flow diagram illustrating one embodiment of a method 300 for dynamically adjusting server settings. In some configurations, the method 300 may be implemented by endpoint protection module 130 illustrated in FIGS. 1 and/or 2.

At block 305, at least one parameter of a status of a server that diverges from a corresponding baseline setting of a policy maintained by the server may be identified. At block 310, an adjustment to the baseline setting of the policy may be calculated based at least in part on the divergent parameter. At block 315, the baseline setting of the policy may be adjusted according to the calculated adjustment. At block 320, a command may be issued to send data representative of the adjusted baseline setting of the policy from the server to a client to update a user profile.

Figure 4:
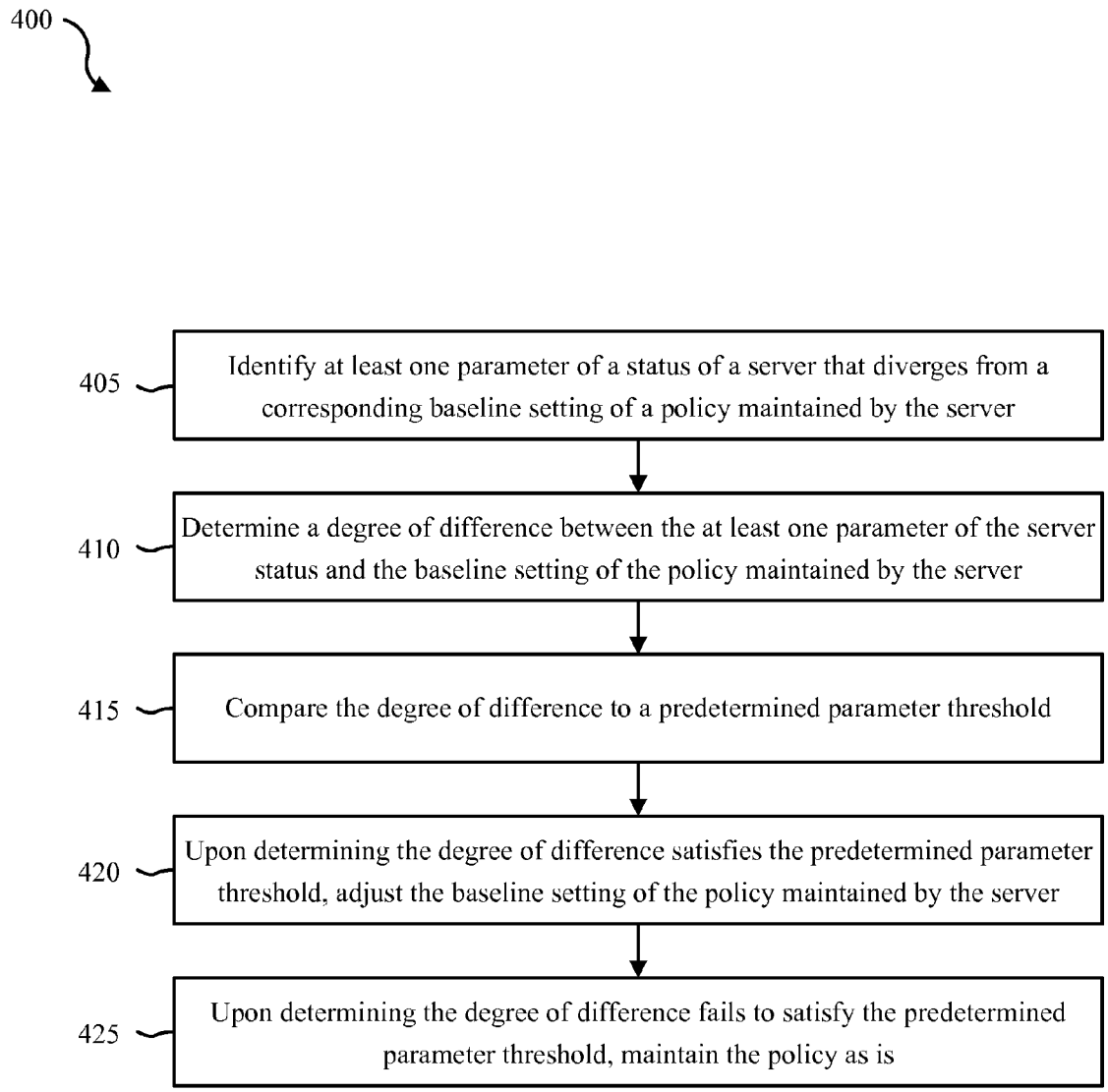
FIG. 4 is a flow diagram illustrating one embodiment of a method for automatically adjusting server policy according to a predetermined threshold.

FIG. 4 is a flow diagram illustrating one embodiment of a method 400 for automatically adjusting server policy according to a predetermined threshold. In some configurations, the method 400 may be implemented by endpoint protection module 130 illustrated in FIGS. 1 and/or 2.

At block 405, at least one parameter of a status of a server that diverges from a corresponding baseline setting of a policy maintained by the server may be identified. At block 410, a degree of difference may be determined between the at least one parameter of the server status and the baseline setting of the policy maintained by the server. At block 415, the degree of difference may be compared to a predetermined parameter threshold. At block 420, upon determining the degree of difference satisfies the predetermined parameter threshold, the baseline setting of the policy maintained by the server may be adjusted. At block 425, upon determining the degree of difference fails to satisfy the predetermined parameter threshold, the policy may be maintained according to a present setting of the policy.

Figure 5:
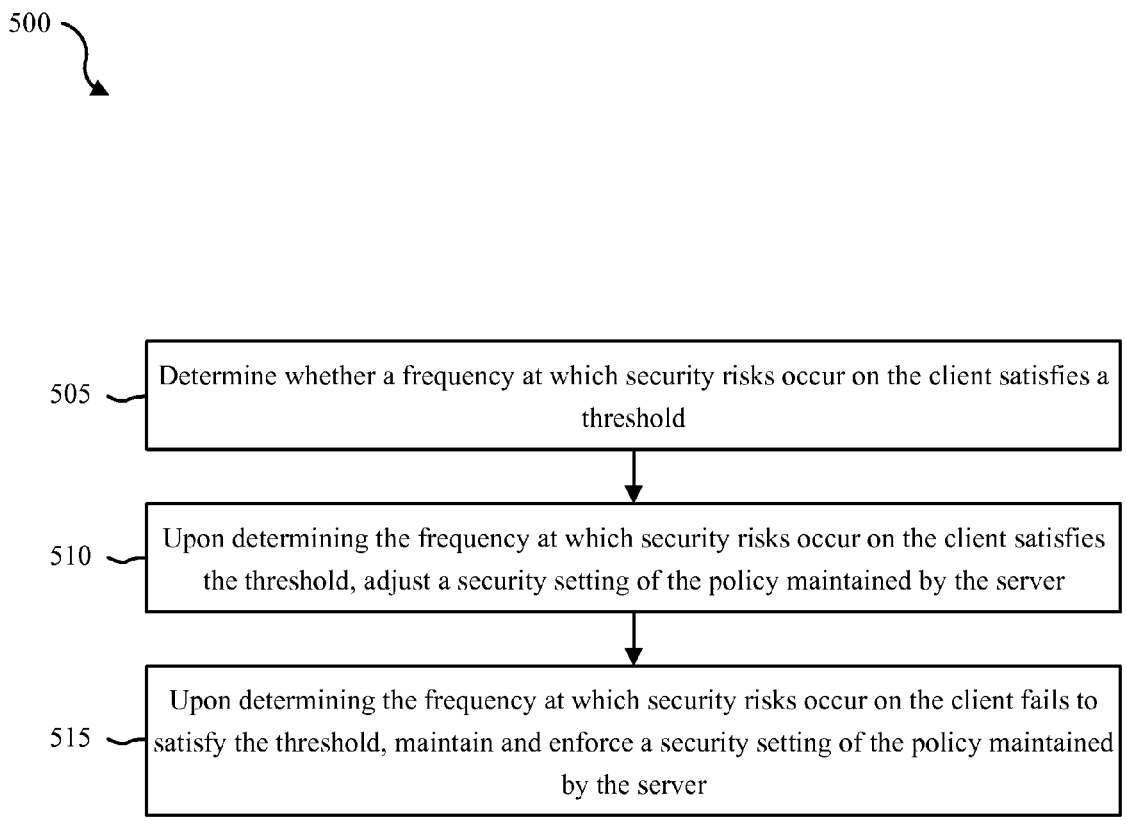
FIG. 5 is a flow diagram illustrating one embodiment of a method for detecting a frequency of security risks.

FIG. 5 is a flow diagram illustrating one embodiment of a method 500 for detecting a frequency of security risks. In some configurations, the method 500 may be implemented by endpoint protection module 130 illustrated in FIGS. 1 and/or 2.

At block 505, a determination may be made whether a frequency at which security risks occur on the client satisfies a threshold. At block 510, upon determining the frequency at which security risks occur on the client satisfies the threshold, a security setting of the policy maintained by the server may be adjusted. At block 510, upon determining the frequency at which security risks occur on the client fails to satisfy the threshold, a security setting of the policy maintained by the server may be maintained and enforced according to a present setting of the policy.

Figure 6:
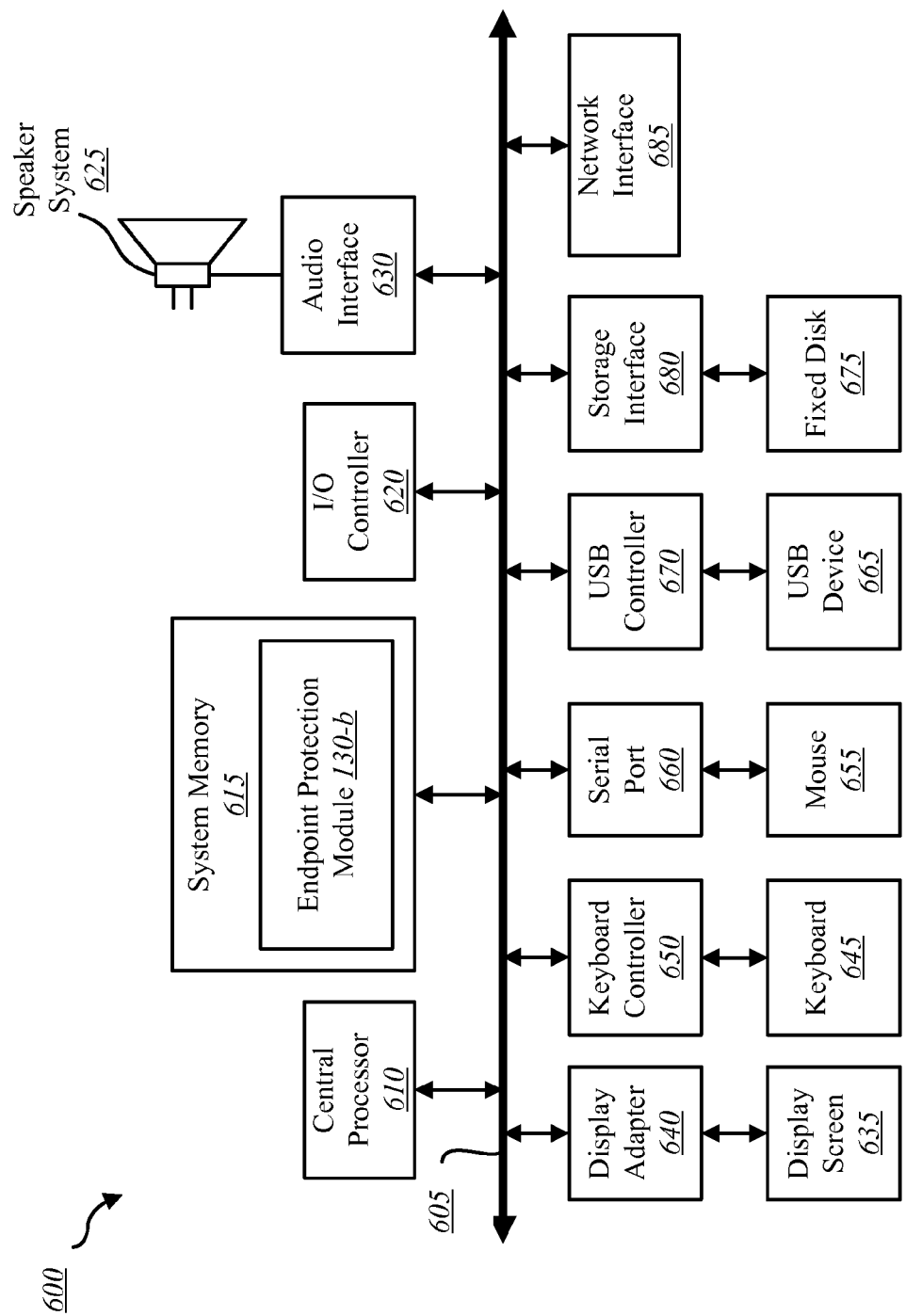
FIG. 6 depicts a block diagram of a computer system suitable for implementing the present systems and methods.

FIG. 6 depicts a block diagram of a computer system 600 suitable for implementing the present systems and methods. Computer system 600 may be one example of devices 105 and 120, and/or server 115 depicted in FIG. 1. Computer system 600 includes a bus 605 which interconnects major subsystems of computer system 600, such as a central processor 610, a system memory 615 (typically RAM, but which may also include ROM, flash RAM, or the like), an input/output controller 620, an external audio device, such as a speaker system 625 via an audio output interface 630, an external device, such as a display screen 635 via display adapter 640, a keyboard 645 (interfaced with a keyboard controller 650) (or other input device), multiple USB devices 665 (interfaced with a USB controller 670), and a storage interface 680. Also included are a mouse 655 (or other point-and-click device) connected to bus 605 through serial port 660 and a network interface 685 (coupled directly to bus 605).

Bus 605 allows data communication between central processor 610 and system memory 615, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, endpoint protection module 130-b to implement the present systems and methods may be stored within the system memory 615. Endpoint protection module 130-b may be one example of endpoint protection module 130 depicted in FIGS. 1 and/or 2. Applications resident with computer system 600 are generally stored on and accessed via a non-transitory computer readable medium, such as a hard disk drive (e.g., fixed disk 675) or other storage medium. Additionally, applications can be in the form of electronic signals modulated in accordance with the application and data communication technology when accessed via interface 685.

Storage interface 680, as with the other storage interfaces of computer system 600, can connect to a standard computer readable medium for storage and/or retrieval of information, such as a fixed disk drive 675. Fixed disk drive 675 may be a part of computer system 600 or may be separate and accessed through other interface systems. Network interface 685 may provide a direct connection to a remote server via a direct network link to the Internet via a POP (point of presence). Network interface 685 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., document scanners, digital cameras, and so on). Conversely, all of the devices shown in FIG. 6 need not be present to practice the present systems and methods. The devices and subsystems can be interconnected in different ways from that shown in FIG. 6. The operation of a computer system such as that shown in FIG. 6 is readily known in the art and is not discussed in detail in this application. Code to implement the present disclosure can be stored in a non-transitory computer-readable medium such as one or more of system memory 615 or fixed disk 675. The operating system provided on computer system 600 may be iOS®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
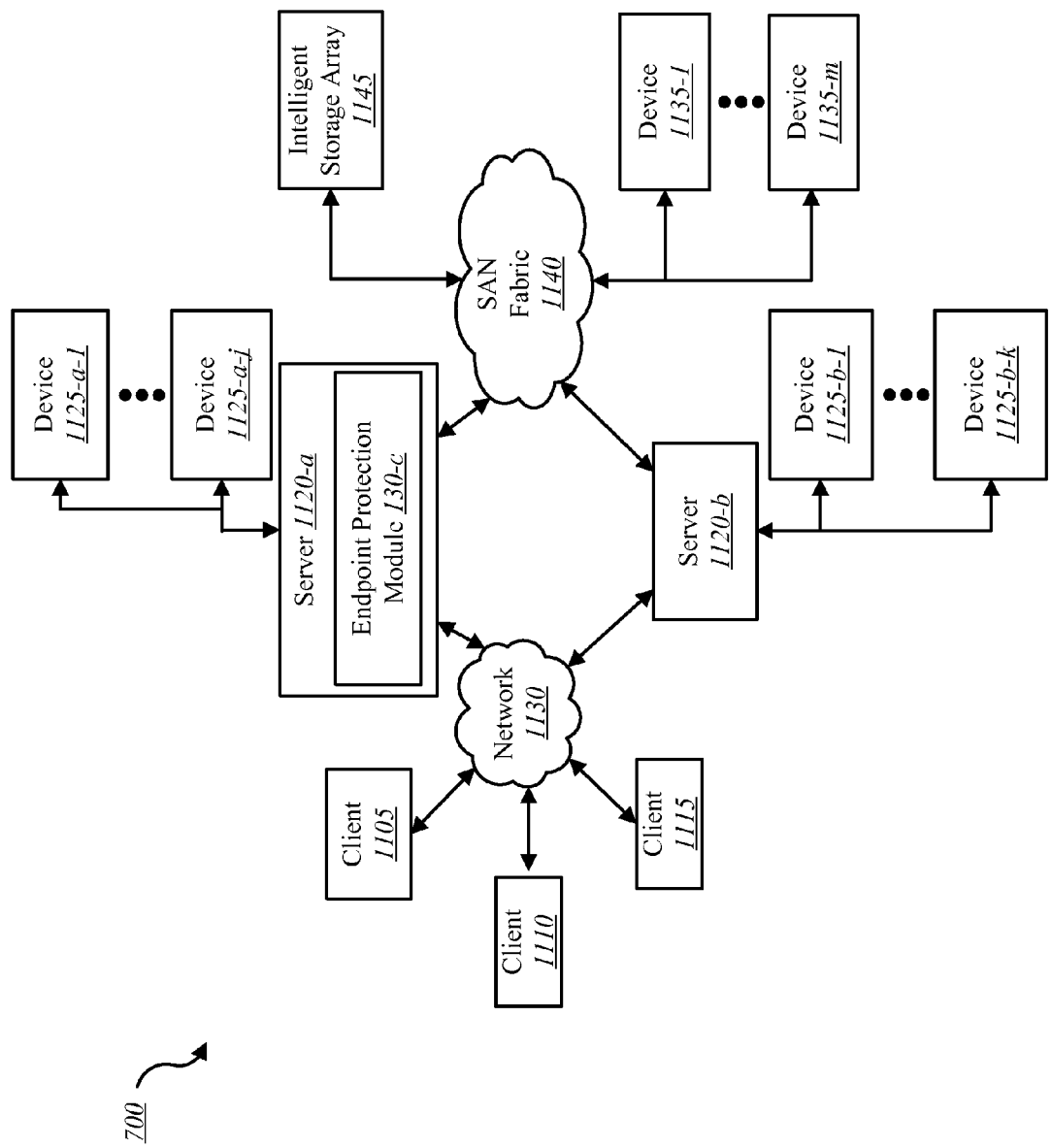
FIG. 7 is a block diagram depicting a network architecture in which client systems, as well as storage servers (any of which can be implemented using the computer system).

FIG. 7 is a block diagram depicting a network architecture 700 in which client systems 705, 710 and 715, as well as storage servers 720-a and 720-b (any of which can be implemented using computer system 600), are coupled to a network 730. In one embodiment, endpoint protection module 130-c may be located within one of the storage servers 720-a, 720-b to implement the present systems and methods. Endpoint protection module 130-c may be one example of endpoint protection module 130 depicted in FIGS. 1, 2, and/or 6. The storage server 720-a is further depicted as having storage devices 725-a-1 through 725-a-j directly attached, and storage server 720-b is depicted with storage devices 725-b-1 through 725-b-k directly attached. SAN fabric 740 supports access to storage devices 735-1 through 735-m by storage servers 720-a and 720-b, and so by client systems 705, 710 and 715 via network 730. Intelligent storage array 745 is also shown as an example of a specific storage device accessible via SAN fabric 740.

With reference to computer system 600, network interface 685 or some other method can be used to provide connectivity from each of client computer systems 705, 710 and 715 to network 730. Client systems 705, 710 and 715 are able to access information on storage server 720-a or 720-b using, for example, a web browser or other client software (not shown). Such a client allows client systems 705, 710 and 715 to access data hosted by storage server 720-a or 720-b or one of storage devices 725-a-1-725-a-j, 725-b-1-725-b-k, 735-1-735-m or intelligent storage array 745. FIG. 7 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for dynamically adjusting server settings, the method comprising:
    identifying, via a processor of a server, at least one parameter of a status of the server that diverges from a corresponding baseline setting of a policy of a client maintained by the server, wherein identifying the at least one parameter that diverges is based at least in part on the processor determining whether a frequency at which malware code is discovered on the client satisfies a first threshold; wherein the policy maintained by the server comprises at least one of a central processing unit (CPU) setting, a memory setting, a storage setting, a network setting, a client setting, a virtual environment setting, a heartbeat interval setting, and a randomization setting;
    determining, via the processor, a degree of difference between the at least one parameter of the server status and the baseline setting of the policy maintained by the server;
    comparing, via the processor, the degree of difference to a predetermined parameter threshold;
    upon determining the frequency at which malware code is discovered on the client satisfies the first threshold, calculating, via the processor, an adjustment to the baseline setting of the policy based at least in part on the divergent parameter;
    determining, via the processor, that the degree of difference satisfies the predetermined parameter threshold;
    adjusting, via the processor, the baseline setting of the policy according to the calculated adjustment based at least in part on the determining that the degree of difference satisfies the predetermined parameter threshold, wherein adjusting the baseline setting of the policy includes increasing at least one of a scan frequency of the client and a malware definition update frequency for the client;
    issuing a command to send, via the processor, data representative of the adjusted baseline setting of the policy from the server to the client via a network; and
    automatically updating one or more client profiles associated with the client according to the adjusted baseline setting of the policy.

2. The method of claim 1, further comprising:
    upon determining the degree of difference fails to satisfy the predetermined parameter threshold for a predetermined amount of time, maintaining the policy according to a present setting of the policy.

3. The method of claim 1, further comprising:
    determining whether a frequency at which security risks other than malware code occur on the client satisfies a predetermined security threshold.

4. The method of claim 3, further comprising:
    upon determining the frequency at which security risks other than malware code occur on the client satisfies the predetermined security threshold, adjusting a security setting of the policy maintained by the server.

5. The method of claim 3, further comprising:
    upon determining the frequency at which security risks other than malware code occur on the client fails to satisfy the predetermined security threshold, maintaining a security setting of the policy maintained by the server.

6. The method of claim 1, wherein the server status comprises at least one central processing unit (CPU) usage, CPU capacity, memory usage, memory capacity, storage usage, storage capacity, network bandwidth, database type, number of connected clients, client security risks, and a client request type.

7. The method of claim 6, wherein the client request type comprises at least one of a scan request, an upgrade request, an update request, and a content download request.

8. A computing device configured to dynamically adjust server settings, comprising:
    a processor of a server;
    memory in electronic communication with the processor;

instructions stored in the memory, the instructions being executable by the processor to:

identify at least one parameter of a status of the server that diverges from a corresponding baseline setting of a policy of a client maintained by the server, wherein identifying the at least one parameter that diverges is based at least in part on determining whether a frequency at which malware code is discovered on the client satisfies a first threshold; wherein the policy maintained by the server comprises at least one of a central processing unit (CPU) setting, a memory setting, a storage setting, a network setting, a client setting, a virtual environment setting, a heartbeat interval setting, and a randomization setting;

determine a degree of difference between the at least one parameter of the server status and the baseline setting of the policy maintained by the server;

compare the degree of difference to a predetermined parameter threshold;

upon determining the frequency at which malware is discovered on the client satisfies the first threshold, calculate an adjustment to the baseline setting of the policy based at least in part on the divergent parameter;

determine that the degree of difference satisfies the predetermined parameter threshold;

adjust the baseline setting of the policy according to the calculated adjustment based at least in part on the determining that the degree of difference satisfies the predetermined parameter threshold, wherein adjusting the baseline setting of the policy includes increasing at least one of a scan frequency of the client and a malware definition update frequency for the client;

issue a command to send data representative of the adjusted baseline setting of the policy from the server to the client via a network; and automatically update one or more client profiles associated with the client according to the adjusted baseline setting of the policy.

9. The computing device of claim 8, wherein the instructions are executable by the processor to:

upon determining the degree of difference fails to satisfy the predetermined parameter threshold for a predetermined amount of time, maintain the policy according to a present setting of the policy.

10. The computing device of claim 8, wherein the instructions are executable by the processor to:

determine a frequency at which security risks other than malware code occur on the client.

11. The computing device of claim 10, wherein the instructions are executable by the processor to:

upon determining the frequency at which security risks other than malware code occur on the client satisfies a predetermined security threshold, adjust a security setting of the policy.

12. The computing device of claim 10, wherein the instructions are executable by the processor to:

upon determining the frequency at which security risks other than malware code occur on the client fails to satisfy a predetermined security threshold, maintain a security setting of the policy maintained by the server.

13. The computing device of claim 8, wherein the server status comprises at least one of the central processing unit (CPU) usage, CPU capacity, memory usage, memory capacity, storage usage, storage capacity, network bandwidth, database type, number of connected clients, client security risks, and client request type.

14. The computing device of claim 13, wherein the client request type comprises at least one of a scan request, an upgrade request, an update request, and a content download request.

15. A computer-program product for dynamically adjusting, by a processor of a server, server settings, the computer-program product comprising a non-transitory computer readable medium storing instructions thereon, the instructions being executable by the processor to:

identify at least one parameter of a status of the server that diverges from a corresponding baseline setting of a policy of a client maintained by the server, wherein identifying the at least one parameter that diverges is based at least in part on determining whether a frequency at which malware code is discovered on the client satisfies a first threshold; wherein the policy maintained by the server comprises at least one of a central processing unit (CPU) setting, a memory setting, a storage setting, a network setting, a client setting, a virtual environment setting, a heartbeat interval setting, and a randomization setting;

determine a degree of difference between the at least one parameter of the server status and the baseline setting of the policy maintained by the server;

compare the degree of difference to a predetermined parameter threshold;

upon determining the frequency at which malware code is discovered on the client satisfies the first threshold, calculate an adjustment to the baseline setting of the policy based at least in part on the divergent parameter;

determine that the degree of difference satisfies the predetermined parameter threshold;

adjust the baseline setting of the policy according to the calculated adjustment based at least in part on the determining that the degree of difference satisfies the predetermined parameter threshold, wherein adjusting the baseline setting of the policy includes increasing at least one of a scan frequency of the client and a malware definition update frequency for the client;

issue a command to send data representative of the adjusted baseline setting of the policy from the server to the client via a network; and automatically update one or more client profiles associated with the client according to the adjusted baseline setting of the policy.

* * * * *